(12) United States Patent
Xiong et al.

(10) Patent No.: US 11,983,456 B2
(45) Date of Patent: May 14, 2024

(54) SCREEN-PROJECTION WITH MULTIPLE TERMINALS (71) Applicant: Shanghai Bilibili Technology Co., Ltd., Shanghai (CN)

(72) Inventors: Zhaozhi Xiong, Shanghai (CN); Jun Jiang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 309 days.

(21) Appl. No.: 17/535,848

(22) Filed: Nov. 26, 2021

(65) Prior Publication Data

US 2022/0137914 A1 May 5, 2022

Related U.S. Application Data (63) Continuation of application No. PCT/CN2020/084520, filed on Apr. 13, 2020.

(30) Foreign Application Priority Data

May 28, 2019 (CN) .......................... 201910449304.9

(51) Int. Cl.
*H04B 7/00* (2006.01)
*G06F 3/14* (2006.01)
(Continued)

(52) U.S. Cl.
CPC ..... *G06F 3/1454* (2013.01); *G06K 19/06037* (2013.01); *G09G 3/2096* (2013.01);
(Continued)

(58) Field of Classification Search
CPC .............. G06F 3/1454; H04N 21/6437; H04N 21/6336; H04W 4/80; H04M 1/0272; H04M 1/7253
See application file for complete search history.

(56) References Cited

U.S. PATENT DOCUMENTS 10,587,925 B2 * 3/2020 Look ...................... G11B 27/34
10,663,555 B2 * 5/2020 Mayuzumi ............ H04W 48/18
(Continued)

FOREIGN PATENT DOCUMENTS

CN 105376701 A 3/2016
CN 107027045 A 8/2017
(Continued)

*Primary Examiner* — Tuan Pham
(74) *Attorney, Agent, or Firm* — McAndrews, Held & Malloy, Ltd.

(57) ABSTRACT

A method is provided. The method includes: creating at least two projected-screen receiving sources according to a local IP address and at least two idle port numbers, and generating respective stream pushing addresses of the at least two projected-screen receiving sources, so that at least two screen projecting terminals obtain the respective stream pushing addresses in a one-to-one correspondence; establishing, for each of the at least two projected-screen receiving sources, a screen-projection connection between the projected-screen receiving source and a screen projecting terminal obtaining a stream pushing address of the projected-screen receiving source; and receiving, by each of the at least two projected-screen receiving sources, projected-screen data pushed by the corresponding screen projecting terminals in screen-projection connection with the projected-screen receiving source.

20 Claims, 10 Drawing Sheets (51) Int. Cl.
    *G06K 19/06*     (2006.01)
    *G09G 3/20*     (2006.01)
    *H04N 21/6437*     (2011.01)

(52) U.S. Cl.
    CPC ... *H04N 21/6437* (2013.01); *G09G 2370/025* (2013.01); *G09G 2370/04* (2013.01); *G09G 2370/06* (2013.01); *G09G 2370/16* (2013.01)

(56) References Cited

U.S. PATENT DOCUMENTS

| | | | |
|---|---|---|---|
| 2013/0094423 A1* | 4/2013 | Wengrovitz | H04L 12/1836 370/312 |
| 2017/0353647 A1* | 12/2017 | Cao | H04N 7/181 |
| 2019/0098351 A1 | 3/2019 | Conan et al. | |
| 2020/0213655 A1* | 7/2020 | Feng | G10L 13/00 |

FOREIGN PATENT DOCUMENTS

| | | | |
|---|---|---|---|
| CN | 107396206 A | 11/2017 | |
| CN | 107454461 A | 12/2017 | |
| CN | 108124173 A | 6/2018 | |
| CN | 108833823 A | 11/2018 | |
| CN | 108989877 A | 12/2018 | |
| CN | 108989879 A | 12/2018 | |
| CN | 109474646 A | 3/2019 | |
| CN | 109525889 A | 3/2019 | |
| CN | 110191350 A | 8/2019 | |

\* cited by examiner

SCREEN-PROJECTION WITH MULTIPLE TERMINALS

CROSS-REFERENCE TO RELATED APPLICATIONS

The present application is a continuation under 35 U.S.C. 111(a) of PCT International Application No. PCT/CN2020/084520, filed on Apr. 13, 2020, which claims the priority to the Chinese Patent Application No. 201910449304.9, filed on May 28, 2019, entitled "Method of screen-projection with multiple terminals, computer device, and storage medium", the entire content of which is incorporated herein by reference.

TECHNICAL FIELD

The present application relates to the technical field of Webcast, and in particular to screen-projection with multiple terminals.

BACKGROUND

Webcast is an emerging social networking way in which one can watch movies on different communication platforms via a network system at the same time, and Webcast platforms also become brand-new social media, Webcast is mainly divided into real-time live broadcast of games, movies, TV series, etc.

SUMMARY

The present application provides a method of screen-projection with multiple terminals applied to a terminal subjected to screen projecting, including:
  creating at least two projected-screen receiving sources according to a local IP address and at least two idle port numbers, and also generating respective stream pushing addresses of the at least two projected-screen receiving sources, so that at least two screen projecting terminals obtain the respective stream pushing addresses in a one-to-one correspondence;
  establishing, for each of the at least two projected-screen receiving sources, a screen-projection connection between the projected-screen receiving source and a corresponding screen projecting terminal, where the corresponding screen projecting terminal is a screen projecting terminal obtaining a stream pushing address of the projected-screen receiving source; and
  receiving, by each of at least two projected-screen receiving sources, projected-screen data pushed by the corresponding screen projecting terminal.

The present application further provides a computer device, including one or more processors; and one or more memories storing one or more programs configured to be executed by the one or more processors, the one or more programs comprising instructions for: creating at least two projected-screen receiving sources according to a local IP address and at least two idle port numbers, and also generating respective stream pushing addresses of the at least two projected-screen receiving sources, so that at least two screen projecting terminals obtain the respective stream pushing addresses in a one-to-one correspondence; establishing, for each of the at least two projected-screen receiving sources, a screen-projection connection between the projected-screen receiving source and a corresponding screen projecting terminal, where the corresponding screen projecting terminal is a screen projecting terminal obtaining a stream pushing address of the projected-screen receiving source; and receiving, by each of the at least two projected-screen receiving sources, projected-screen data pushed by the corresponding screen projecting terminal.

The present application further provides a computer-readable storage medium storing one or more programs, the one or more programs comprising instructions, upon executed by one or more processors of an electronic device, cause the electronic device to perform operations comprising: creating at least two projected-screen receiving sources according to a local IP address and at least two idle port numbers, and also generating respective stream pushing addresses of the at least two projected-screen receiving sources, so that at least two screen projecting terminals obtain the respective stream pushing addresses in a one-to-one correspondence; establishing, for each of the at least two projected-screen receiving sources, a screen-projection connection between the projected-screen receiving source and a corresponding screen projecting terminal, where the corresponding screen projecting terminal is a screen projecting terminal obtaining a stream pushing address of the projected-screen receiving source; and receiving, by each of the at least two projected-screen receiving sources, projected-screen data pushed by the corresponding screen projecting terminal.

DETAILED DESCRIPTION OF ILLUSTRATIVE EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

The terms used in the present application are merely for the purpose of describing particular embodiments and are not intended to limit the present disclosure. The terms "a/an", "said" and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second and third, may be used in the present disclosure to describe various types of information, such information should not be limited to these terms. These terms are merely used to distinguish the same type of information from each other. For example, without departing from the scope of the present disclosure, the first screen projecting terminal may also be referred to as the second screen projecting terminal, and similarly, the second screen projecting terminal may also be referred to as the first screen projecting terminal.

The inventor has noted that at present, one terminal subjected to screen projecting (such as a PC terminal) can support the screen projecting from only one screen projecting terminal (such as a mobile phone terminal), and consequently, this cannot meet user requirements in some cases. For example, for the live broadcast of a multi-player game, game audio and video data of a plurality of players on mobile phone terminals cannot be simultaneously projected to the same PC terminal. For example, by taking the game "Arena of Valor" as an example, which is usually a 5V5 battle mode, but it is not possible to project all game audio and video data of five players in one party to the same PC terminal for live broadcast, which results in a poor user experience.

Figure 1:
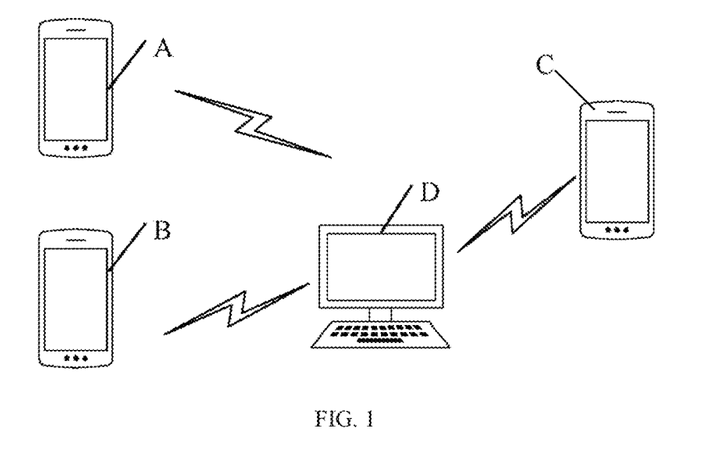
FIG. 1 is an architecture diagram of an embodiment of a system architecture used by a method of screen-projection with multiple terminals according to some embodiments of the present application.

FIG. 1 is a diagram of a system architecture used in the present application. As shown in FIG. 1, mobile terminals A, B, and C are used as screen projecting terminals to project a screen, and a PC terminal D is used as a terminal subjected to screen projecting. The aim of the present application is to simultaneously project audio and video data played by the mobile terminals A, B, and C to the PC terminal D. It should be noted that three mobile terminals to project a screen are shown in FIG. 1. In actual applications, there may be two or three or more mobile terminals, and there is no limitation on the number thereof here. The mobile terminal devices A, B, and C are not limited to the mobile devices illustrated, and all smart terminals that can push streams/perform live broadcast are applicable.

Figure 2:
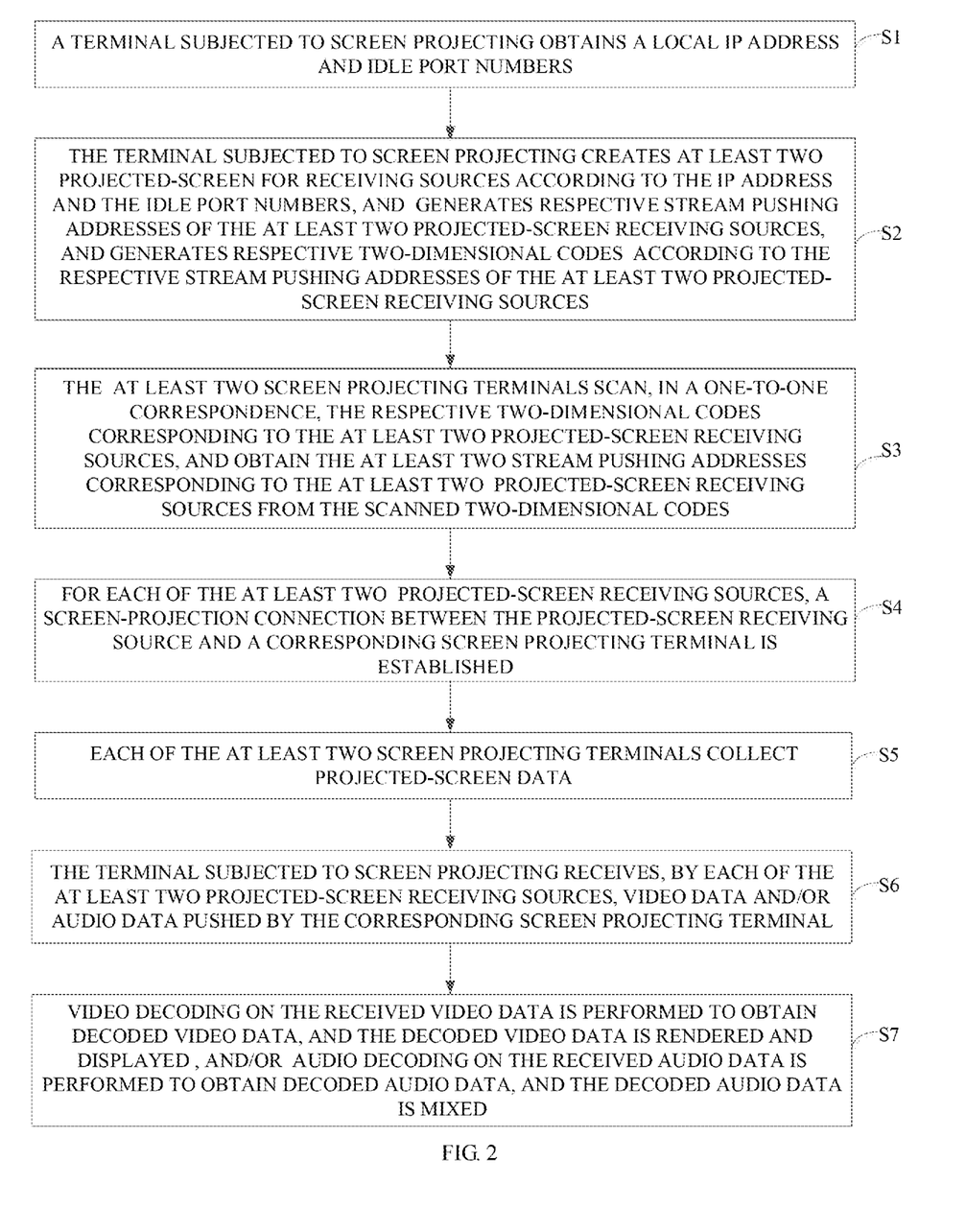
FIG. 2 is a flowchart of an embodiment of a method of screen-projection with multiple terminals according to some embodiments of the present application.
Figure 3:
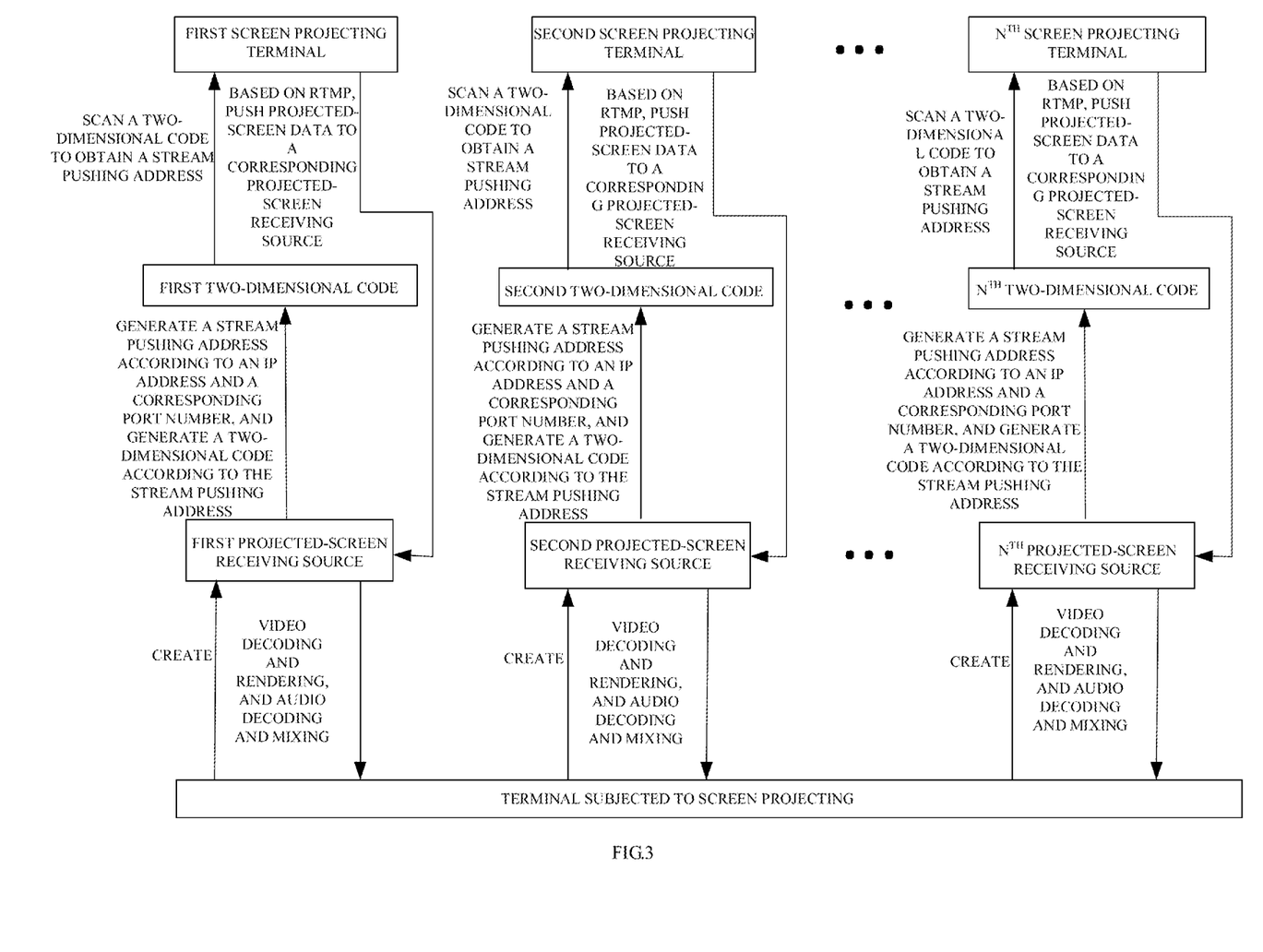
FIG. 3 is a data exchange relationship diagram of a method of screen-projection with multiple terminals according to some embodiments of the present application.

According to some embodiments, a method of screen-projection with multiple terminals is provided to implement screen projecting from at least two screen projecting terminals (i.e. mobile terminals such as mobile phones) on a terminal subjected to screen projecting (such as a PC terminal). As shown in FIG. 2 and FIG. 3, the method includes the steps as follows.

In S1, the terminal subjected to screen projecting obtains a local IP address and at least two idle port numbers. The number of idle port numbers obtained should not be less than the number of screen projecting terminals to project a screen. It should be understood that in order to implement screen projecting, the obtained IP address should be an IP address for connecting to the Internet.

In S2, the terminal subjected to screen projecting creates at least two projected-screen receiving sources according to the obtained IP address and at least two idle port numbers, and also generates respective stream pushing addresses of the at least two projected-screen receiving sources, so that at least two screen projecting terminals obtain the respective stream pushing addresses in a one-to-one correspondence. For example, assuming that there are two screen projecting terminals that need project a screen on the terminal subjected to screen projecting, two projected-screen receiving sources need to be established, and two idle port numbers need to be obtained correspondingly. Assuming that the two idle port numbers obtained are a port number P and a port number Q, one projected-screen receiving source (denoted as a first projected-screen receiving source) can be created according to the IP address of the terminal subjected to screen projecting and the port number P, and a stream pushing address of the first projected-screen receiving source can also be generated according to the IP address of the terminal subjected to screen projecting and the port number P, where the port number P is a port number of the first projected-screen receiving source; similarly, the other projected-screen receiving source (denoted as a second projected-screen receiving source) can be created according to the IP address of the terminal subjected to screen projecting and the port number Q, and a stream pushing address of the second projected-screen receiving source can also be generated according to the IP address of the terminal subjected to screen projecting and the port number Q, where the port number Q is a port number of the second projected-screen receiving source. By analogy, as shown in FIG. 3, N (N≥2) projected-screen receiving sources (i.e., the first to the $N^{th}$ projected-screen receiving sources) can be created, as required, in the present application. The projected-screen receiving sources can be created by means of an existing FFmpeg tool, and the process of creating the projected-screen receiving sources by means of the FFmpeg tool is a conventional technical means in the art.

The projected-screen receiving sources according to some embodiments may be receiving sources for receiving projected-screen data pushed based on a real-time messaging protocol (rtmp) protocol. The rtmp protocol is a streaming media transport protocol established and maintained by Adobe Inc. The protocol is based on the TCP protocol and can solve the problems of multiplexing and fragmentation of multimedia data transport streams, and it is widely used in video live broadcast and other fields.

According to some embodiments, the foregoing step of generating respective stream pushing addresses of the at least two projected-screen receiving sources, so that at least two screen projecting terminals obtain the respective stream pushing addresses in a one-to-one correspondence includes: generating the respective stream pushing addresses of the at least two projected-screen receiving sources, according to the local IP address and the at least two idle port numbers, and generating and displaying respective two-dimensional codes corresponding to the projected-screen receiving sources, according to the respective stream pushing addresses of the at least two projected-screen receiving sources so that the at least two screen projecting terminals scan the respective two-dimensional codes in a one-to-one correspondence and obtain the respective stream pushing addresses corresponding to the at least two projected-screen receiving sources from the scanned respective two-dimensional codes. As shown in FIG. 3, a two-dimensional code (i.e., a first two-dimensional code) corresponding to the first projected-screen receiving source is generated according to the stream pushing address of the first projected-screen receiving source, a two-dimensional code (i.e., a second two-dimensional code) corresponding to the second projected-screen receiving source is generated according to the stream pushing address of the second projected-screen receiving source, and by analogy, a two-dimensional code (i.e., an $N^{th}$ two-dimensional code) corresponding to the $N^{th}$ projected-screen receiving source is generated according to the stream pushing address of the $N^{th}$ projected-screen receiving source.

In S3, the at least two screen projecting terminals to project a screen scan, in a one-to-one correspondence, the respective two-dimensional codes corresponding to the at least two projected-screen receiving sources, so as to obtain the at least two stream pushing addresses corresponding to the at least two projected-screen receiving sources from the scanned two-dimensional codes. For example, as shown in FIG. 3, assuming that there are N screen projecting terminals (denoted as the first to the $N^{th}$ screen projecting terminals) that need to project a screen, the first screen projecting terminal can scan a first two-dimensional code to obtain the stream pushing address which corresponds to the first projected-screen receiving source and is carried in the first two-dimensional code, the second screen projecting terminal can scan a second two-dimensional code to obtain the stream pushing address which corresponds to the second projected-screen receiving source and is carried in the second two-dimensional code, and so on, until the $N^{th}$ screen projecting terminal scans an $N^{th}$ two-dimensional code to obtain the stream pushing address which corresponds to the $N^{th}$ projected-screen receiving source and is carried in the $N^{th}$ two-dimensional code.

In S4, for each of the at least two projected-screen receiving sources, a screen-projection connection is established between the projected-screen receiving source and a corresponding screen projecting terminal, where the corresponding screen projecting terminal is a screen projecting terminal that obtains a stream pushing address of the projected-screen receiving source. For example, as shown in FIG. 3, when the first screen projecting terminal scans the two-dimensional code corresponding to the first projected-screen receiving source to obtain the stream pushing address carried in the two-dimensional code, a screen-projection connection is established between the first screen projecting terminal and the first projected-screen receiving source; and when the second screen projecting terminal scans the two-dimensional code corresponding to the second projected-screen receiving source to obtain the stream pushing address carried in the two-dimensional code, a screen-projection connection is established between the second screen projecting terminal and the second projected-screen receiving source, and so on, until when the $N^{th}$ screen projecting terminal scans the two-dimensional code corresponding to the $N^{th}$ projected-screen receiving source to obtain the stream pushing address carried in the two-dimensional code, a screen-projection connection is established between the $N^{th}$ screen projecting terminal and the $N^{th}$ projected-screen receiving source.

In S5, each of the at least two screen projecting terminals that established a screen-projection connection collect projected-screen data, where the projected-screen data includes video data and/or audio data. When the projected-screen data is the video data, the screen projecting terminal can perform video encoding on the collected video data by using an encoding technology such as h264. When the projected-screen data is the audio data, the screen projecting terminal can perform audio encoding on the collected audio data by using an encoding technology such as aac. After that, the screen projecting terminal pushes, to the corresponding projected-screen receiving source in screen-projection connection therewith, the encoded video data and audio data by means of the rtmp protocol.

In S6, the terminal subjected to screen projecting receives, by each of the at least two projected-screen receiving sources, projected-screen data pushed by the corresponding screen projecting terminal. For example, assuming that a screen-projection connection is established between the first screen projecting terminal and the first projected-screen receiving source, the projected-screen data pushed by the first screen projecting terminal is received by the first projected-screen receiving source; assuming that a screen-projection connection is established between the second screen projecting terminal and the second projected-screen receiving source, the projected-screen data pushed by the second screen projecting terminal is received by the second projected-screen receiving source, and by analogy, assuming that a screen-projection connection is established between the $N^{th}$ screen projecting terminal and the $N^{th}$ projected-screen receiving source, the projected-screen data pushed by the $N^{th}$ screen projecting terminal is received by the $N^{th}$ projected-screen receiving source.

In S7, when the projected-screen data includes the video data, after the video data is received by the terminal subjected to screen projecting, video decoding is performed on the received video data to obtain decoded video data, and the decoded video data is rendered and displayed; and when the projected-screen data includes the audio data, after the audio data is received by the terminal subjected to screen projecting, audio decoding is performed on the received audio data to obtain decoded audio data, and the decoded audio data is mixed. Rendering involves drawing a video into a view for displaying, and rendering can be performed by means of Image View. Mixing involves superimposing a plurality of channels of audio data into one channel of data.

The above steps S1 to S8 are further described below in a specific application scenario. When audio and video data on mobile phones of five members of one Arena of Valor team need to be projected to the same PC terminal for live broadcast, the PC terminal first obtains a local IP address and five idle port numbers; next, a total of five projected-screen receiving sources are created according to each of the obtained idle port numbers and IP address, and respective stream pushing addresses of the five projected-screen receiving sources are also generated; then, respective two-dimensional codes corresponding to the five projected-screen receiving sources are generated according to the respective stream pushing addresses of the five projected-screen receiving sources, and same are displayed; the respective mobile phones of the five team members scan the respective two-dimensional codes corresponding to the five projected-screen receiving sources in a one-to-one correspondence, so as to obtain the respective stream pushing addresses carried in the two-dimensional codes, thereby establishing a screen-projection connection between the mobile phones of the five team members and the five projected-screen receiving sources in a one-to-one correspondence; the respective mobile phones of the five team members respectively collect the game audio and video data, encode same and then push same; and finally, the five projected-screen receiving sources on the PC terminal receive, in a one-to-one correspondence, the audio and video data pushed by the five mobile phones, the video data received by the five projected-screen receiving sources is subjected to video decoding and then rendered and displayed, and the audio data received by the five projected-screen receiving sources is subjected to audio decoding and then mixed. In this way, the audio and video data of five mobile phones are projected to the same PC terminal, which is convenient for users to watch.

It can be seen from the above steps that the present application can achieve the aim of audio and video data of a plurality of screen projecting terminals being projected to the same terminal subjected to screen projecting, thereby improves the user experience. If a screen projecting terminal needs to be added, a new idle port number is obtained to create a new projected-screen receiving source, without occupying the default port 1935 of rtmp; moreover, all the projected-screen receiving sources have different stream pushing addresses, and therefore, a number of projected-screen receiving sources are supported in theory, that is, there is no limitation on an upper limit of the number of screen projecting terminals.

In actual applications, when it is detected that no projected-screen data is received by a projected-screen receiving source of the at least two projected-screen receiving sources within a predetermined period of time, a screen-projection connection between the one projected-screen receiving source and the corresponding screen projecting terminal is disconnected. Specifically, after a screen-projection connection is established between a screen projecting terminal and a projected-screen receiving source of the at least two projected-screen receiving sources, each time the screen projecting terminal stops sending projected-screen data, a terminal subjected to screen projecting starts timing, and if the screen projecting terminal has not sent any projected-screen data even when the time exceeds a preset duration (such as 10 minutes), the screen-projection connection between the one projected-screen receiving source and the corresponding screen projecting terminal is disconnected, so that the one projected-screen receiving source will no longer receive the projected-screen data pushed by the corresponding screen projecting terminal.

In addition, when a screen-projection disconnection instruction for disconnecting a screen-projection connection between a projected-screen receiving source of the at least two projected-screen receiving sources and the corresponding screen projecting terminal is received, the screen-projection connection between the projected-screen receiving source and the corresponding screen projecting terminal is disconnected. Specifically, on a terminal subjected to screen projecting, a screen-projection disconnection control key is disposed for each of the at least two projected-screen receiving sources. When the screen-projection disconnection control key is clicked by a user, the terminal subjected to screen projecting will receive a screen-projection disconnection instruction. In this case, the screen-projection connection between one projected-screen receiving source of the at least two projected-screen receiving sources and the corresponding screen projecting terminal is disconnected, so that the one projected-screen receiving source will no longer receive the projected-screen data pushed by the corresponding screen projecting terminal.

It should be understood that when a projected-screen receiving source of the at least two projected-screen receiving sources is deleted, a screen-projection connection between the one projected-screen receiving source and the corresponding screen projecting terminal will be disconnected inevitably.

Figure 4:
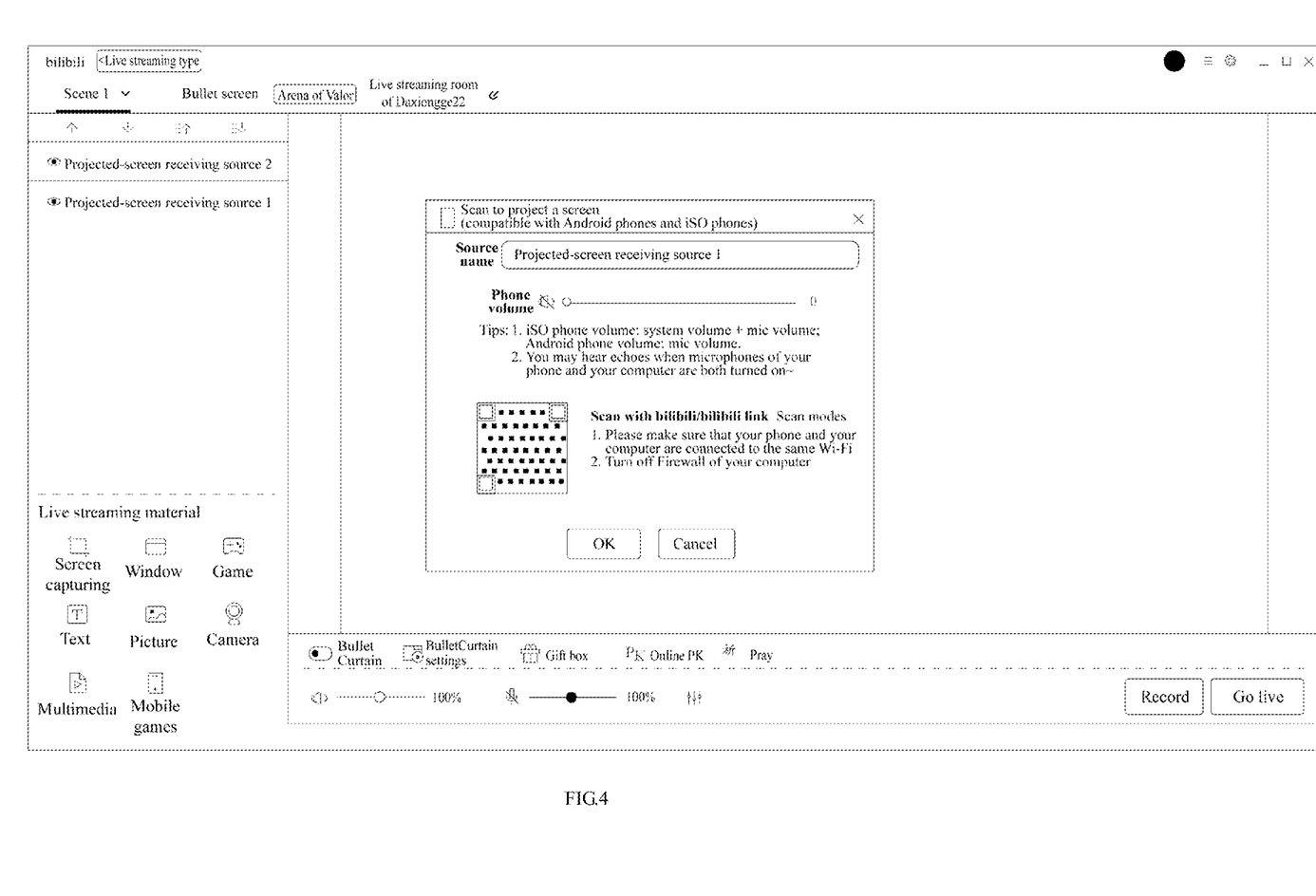
FIG. 4 is a first state change diagram of an APP embodiment implemented using a method of screen-projection with multiple terminals according to some embodiments of the present application.
Figure 5:
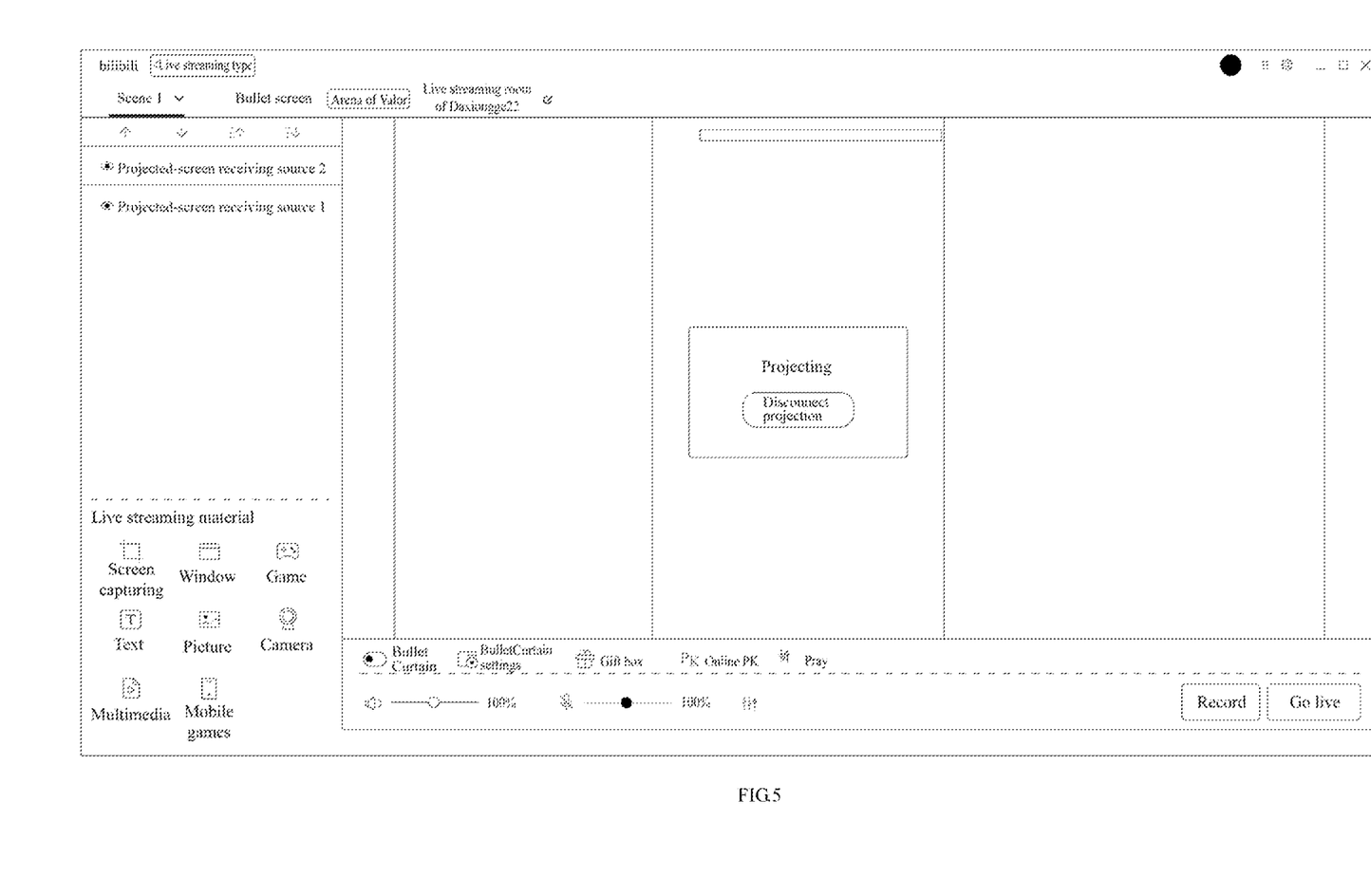
FIG. 5 is a second state change diagram of the APP in FIG. 4.
Figure 6:
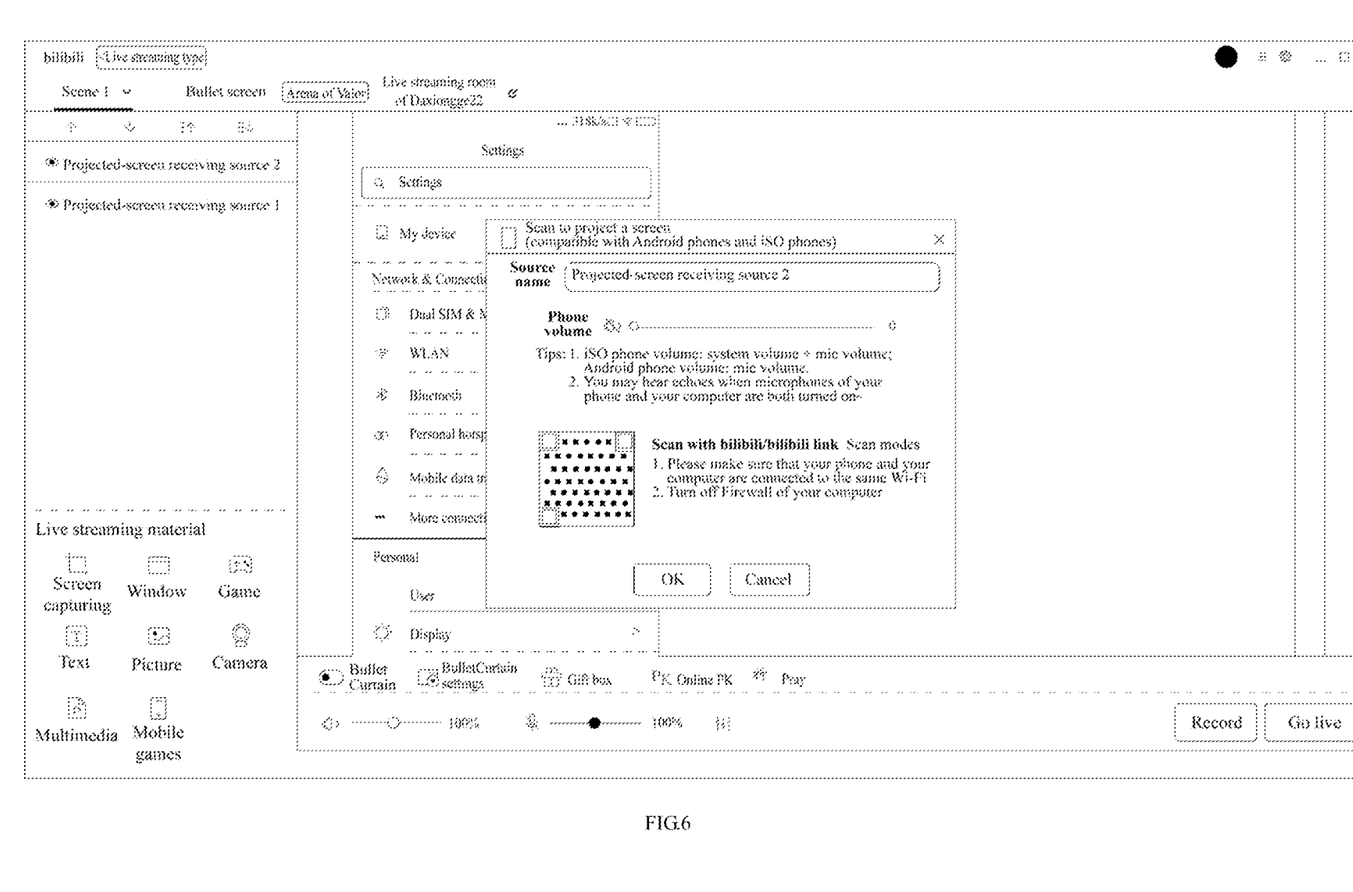
FIG. 6 is a third state change diagram of the APP in FIG. 4.
Figure 7:
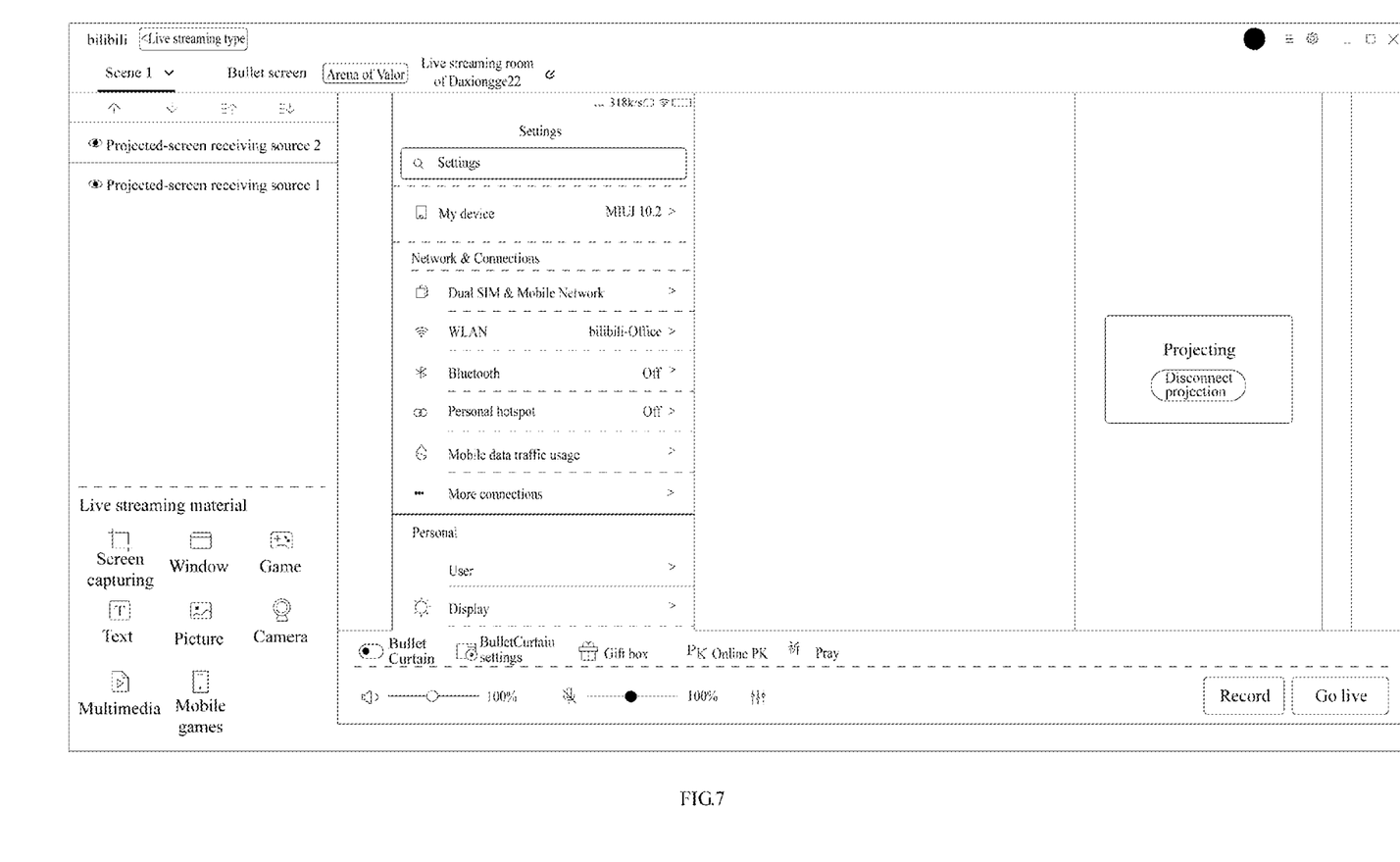
FIG. 7 is a fourth state change diagram of the APP in FIG. 4.
Figure 8:
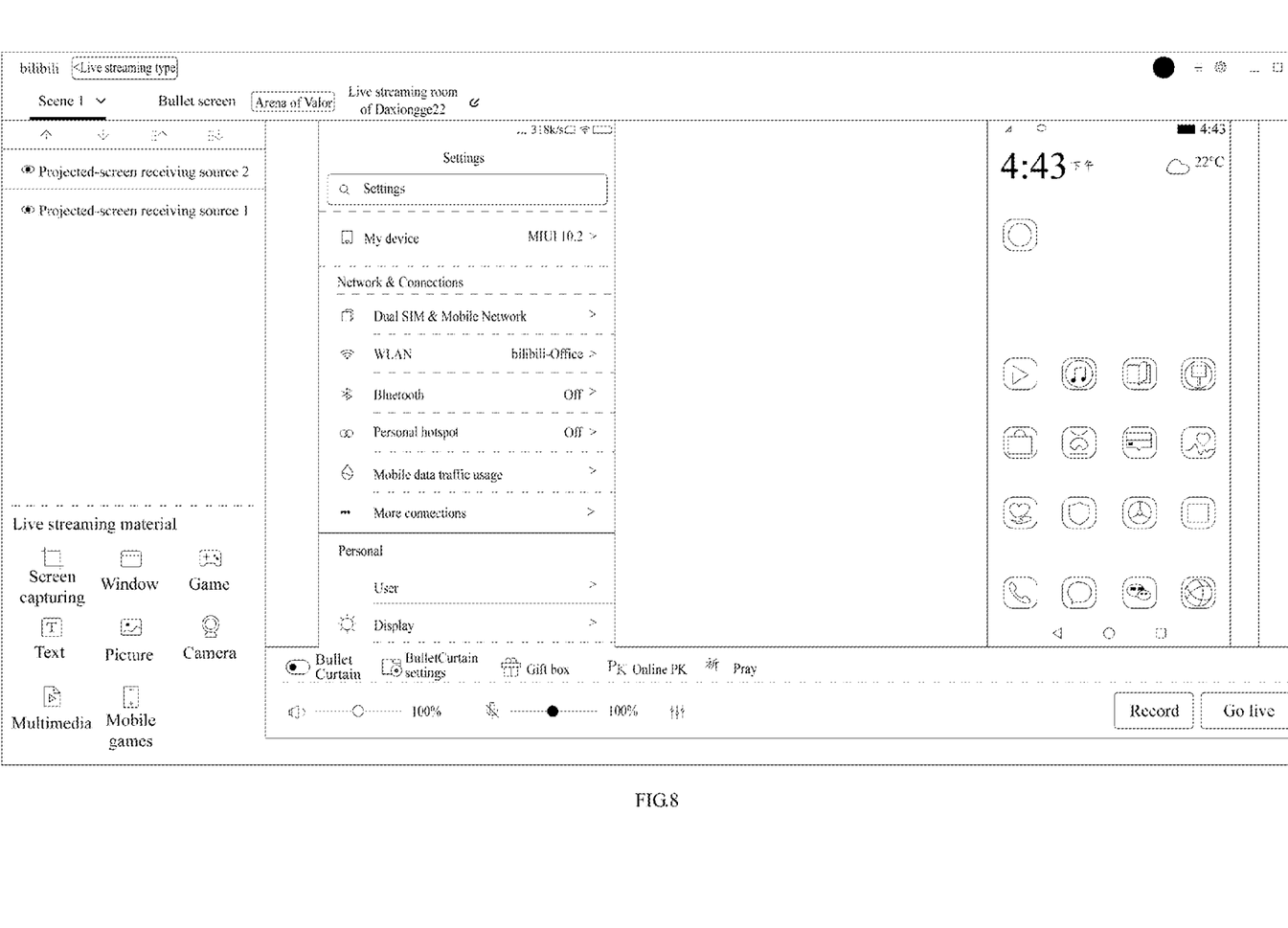
FIG. 8 is a fifth state change diagram of the APP in FIG. 4.

FIG. 4 to FIG. 8 are diagrams of a plurality of state interfaces of an APP implemented using a method of screen-projection with multiple terminals according to the present application. As shown in FIG. 4, on the terminal subjected to screen projecting, two projected-screen receiving sources are created, which are respectively a "Projected-screen receiving source 1" and a "Projected-screen receiving source 2". When a control corresponding to the Projected-screen receiving source 1 is clicked, a pop-up window with a two-dimensional code will pop up, the two-dimensional code carrying a stream pushing address corresponding to the Projected-screen receiving source 1. When a screen projecting terminal 1 scans the two-dimensional code in FIG. 4, the interface in FIG. 5 will be displayed. Once a screen-projection connection is established between the screen projecting terminal 1 and the Projected-screen receiving source 1, as shown in FIG. 6, the display interface of the screen projecting terminal 1 can be projected to the terminal subjected to screen projecting. Then, a control corresponding to the Projected-screen receiving source 2 is clicked, and a pop-up window (see FIG. 6) with a two-dimensional code will also pop up, the two-dimensional code carrying a stream pushing address corresponding to the Projected-screen receiving source 2. When a screen projecting terminal 2 scans the two-dimensional code in FIG. 6, the interface in FIG. 7 will be displayed. Once a connection is established between the screen projecting terminal 2 and the Projected-screen receiving source 2, as shown in FIG. 8, the display interface of the screen projecting terminal 2 can be projected to the terminal subjected to screen projecting at the same time.

It should be noted that, for brief description, some embodiments are represented as a series of actions. However, it is to be appreciated by those skilled in the art that the present application is not limited to the order of describing the actions, because some steps may be performed in other orders or simultaneously according to the present application. In addition, it is also to be appreciated by those skilled in the art that all the embodiments described in the specification are some embodiments, and the related actions are not necessarily required in the present application.

Figure 9:
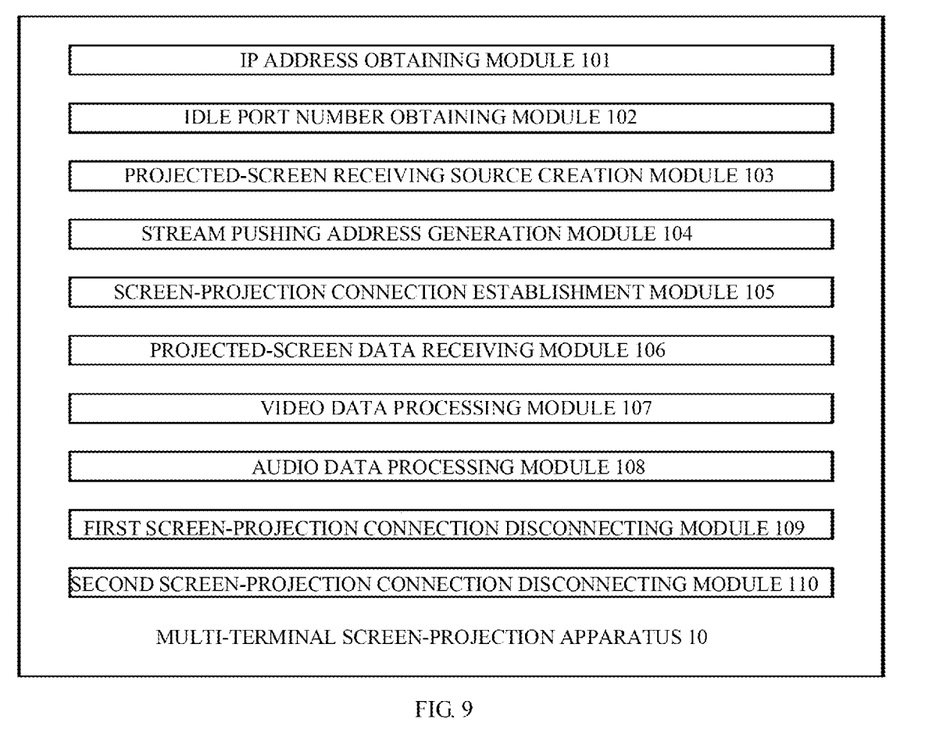
FIG. 9 is a structural block diagram of an embodiment of an apparatus of screen-projection with multiple terminals according to some embodiments of the present application.

As shown in FIG. 9, according to some embodiments, a multi-terminal screen-projection apparatus 10 is provided as a terminal subjected to screen projecting, the apparatus including:

an IP address obtaining module 101 configured to obtain a local IP address. In order to implement screen projecting, the obtained IP address should be an IP address for connecting to the Internet.

The multi-terminal screen-projection apparatus includes an idle port number obtaining module 102 configured to obtain at least two local idle port numbers. The number of idle port numbers obtained is not less than the number of screen projecting terminals that need to project a screen.

The multi-terminal screen-projection apparatus includes a projected-screen receiving source creation module 103 configured to create at least two projected-screen receiving sources according to the local IP address and the at least two idle port numbers and by means of an existing FFmpeg tool. For example, assuming that there are two screen projecting terminals that need to project a screen, two projected-screen receiving sources need to be established, and two idle port numbers need to be obtained correspondingly. Assuming that the two idle port numbers obtained are a port number P and a port number Q, one projected-screen receiving source (denoted as the first projected-screen receiving source) can be created according to the local IP address and the port number P, and the other projected-screen receiving source can be created according to the IP address of the terminal subjected to screen projecting and the port number Q. The projected-screen receiving sources according to some embodiments are receiving sources for receiving projected-screen data sent based on a real-time messaging protocol (rtmp) protocol. The rtmp protocol is a streaming media transport protocol established and maintained by Adobe Inc. The protocol is based on the TCP protocol and can solve the problems of multiplexing and fragmentation of multimedia data transport streams, and it is widely used in video live broadcast and other fields.

The multi-terminal screen-projection apparatus includes a stream pushing address generation module 104 configured to generate respective stream pushing addresses of the at least two projected-screen receiving sources, so that at least two screen projecting terminals obtain the stream pushing addresses in a one-to-one correspondence. Specifically, the respective stream pushing addresses of the two projected-screen receiving sources are generated according to the local IP address of the terminal subjected to screen projecting and the at least two idle port numbers, and then respective two-dimensional codes corresponding to the at least two projected-screen receiving sources are respectively generated according to the respective stream pushing addresses of the at least two projected-screen receiving sources, and same are displayed, so that the at least two screen projecting terminals scan the respective two-dimensional codes in a one-to-one correspondence so as to obtain the stream pushing addresses corresponding to the at least two projected-screen receiving sources from the scanned two-dimensional codes. For example, assuming that there are two screen projecting terminals (denoted as the first and second screen projecting terminals) that need to project a screen, the first screen projecting terminal can scan a two-dimensional code corresponding to the foregoing first projected-screen receiving source to obtain the stream pushing address which corresponds to the first projected-screen receiving source and is carried in the two-dimensional code, the second screen projecting terminal can scan a two-dimensional code corresponding to the foregoing second projected-screen receiving source to obtain the stream pushing address which corresponds to the second projected-screen receiving source and is carried in the two-dimensional code, and so on.

The multi-terminal screen-projection apparatus includes a screen-projection connection establishment module 105 configured to establish a screen-projection connection between each of the at least two projected-screen receiving sources and a screen projecting terminal that obtains a stream pushing address of the corresponding projected-screen receiving source. For example, if the first screen projecting terminal scans the two-dimensional code corresponding to the first projected-screen receiving source to obtain the stream pushing address carried in the two-dimensional code, a screen-projection connection is established between the first screen projecting terminal and the first projected-screen receiving source; if the second screen projecting terminal scans the two-dimensional code corresponding to the second projected-screen receiving source to obtain the stream pushing address carried in the two-dimensional code, a screen-projection connection is established between the second screen projecting terminal and the second projected-screen receiving source, and so on.

The multi-terminal screen-projection apparatus includes a projected-screen data receiving module 106 configured to receive, by each of the at least two projected-screen receiving sources, projected-screen data pushed by the corresponding screen projecting terminals in screen-projection connection with the projected-screen receiving sources. For example, assuming that a screen-projection connection is established between the first screen projecting terminal and the first projected-screen receiving source, the projected-screen data pushed by the first screen projecting terminal is received by the first projected-screen receiving source; assuming that a screen-projection connection is established between the second screen projecting terminal and the second projected-screen receiving source, the projected-screen data pushed by the second screen projecting terminal is received by the second projected-screen receiving source, and so on.

According to some embodiments, the projected-screen data pushed by each of the at least two screen projecting terminals includes video data and audio data which are currently being played locally (it may alternatively include only one of the video data and the audio data). Each of the at least two screen projecting terminals starts to collect audio and video data after establishing a screen-projection connection to the corresponding projected-screen receiving source, performs video encoding on the collected video data by using an encoding technology such as h264 and performs audio encoding on the collected audio data by using an encoding technology such as aac, and then, pushes, to the corresponding projected-screen receiving source in screen-projection connection therewith, the encoded video data and audio data by means of the rtmp protocol.

According to some embodiments, the multi-terminal screen-projection apparatus further includes: a video data processing module 107 configured to, after the video data is received by each of the at least two projected-screen receiving sources, perform video decoding on the received video data to obtain decoded video data, and render and display the decoded video data, Rendering involves drawing a video into a view for display, and rendering can be done by means of Image View.

According to some embodiments, the multi-terminal screen-projection apparatus further includes: an audio data processing module 108 configured to, after the audio data is receive by each of the at least two projected-screen receiving sources, perform audio decoding on the received audio data to obtain decoded audio data, and mix the decoded audio data. Mixing involves superimposing a plurality of channels of audio data into one channel of data.

According to some embodiments, the multi-terminal screen-projection apparatus further includes: a first screen-projection connection disconnecting module 109 configured to, when detecting that no projected-screen data is received by one projected-screen receiving source of the at least two projected-screen receiving sources within a predetermined period, disconnect a screen-projection connection between the one projected-screen receiving source and the corresponding screen projecting terminal. That is, after a screen-projection connection is established between a screen projecting terminal and a projected-screen receiving source, each time the screen projecting terminal stops sending projected-screen data, a terminal subjected to screen projecting starts timing, and if the screen projecting terminal has not sent any projected-screen data even when the time exceeds a preset period (such as 10 minutes), the screen-projection connection between the projected-screen receiving source and the corresponding screen projecting terminal is disconnect, so that the projected-screen receiving source will no longer receive the projected-screen data pushed by the corresponding screen projecting terminal.

According to some embodiments, the multi-terminal screen-projection apparatus further includes: a second screen-projection connection disconnecting module 110 configured to, when a screen-projection disconnection instruction for disconnecting a screen-projection connection between one projected-screen receiving source of the at least two projected-screen receiving sources and the corresponding screen projecting terminal is received, disconnect the screen-projection connection between the one projected-screen receiving source and the corresponding screen projecting terminal. Specifically, on a terminal subjected to screen projecting, a screen-projection disconnection control key is disposed for each projected-screen receiving source. When the screen-projection disconnection control key is clicked by a user, the terminal subjected to screen projecting will receive a screen-projection disconnection instruction. In this case, the screen-projection connection between one projected-screen receiving source of the at least two projected-screen receiving source and the corresponding screen projecting terminal is disconnected, so that the one projected-screen receiving source will no longer receive the projected-screen data pushed by the corresponding screen projecting terminal.

It is also to be appreciated by those skilled in the art that all the embodiments described in the specification are some embodiments, and the related modules and actions are not necessarily required in the present application.

Figure 10:
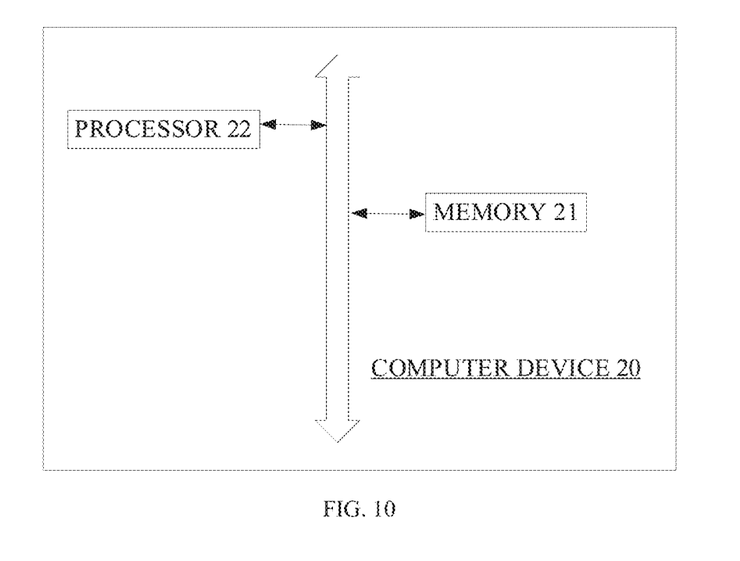
FIG. 10 is a hardware architecture diagram of an embodiment of a computer device according to some embodiments of the present application.

The present application further provides a computer device, for example, a smart phone, a tablet computer, a notebook computer, a desktop computer, a rack server, a blade server, a tower server, or a cabinet server (including an independent server, or a server cluster composed of a plurality of servers) that can execute programs, etc. The computer device 20 according to some embodiments at least includes but is not limited to: a memory 21 and a processor 22 that can be communicatively connected to each other via a system bus, as shown in FIG. 10. It should be noted that FIG. 10 shows only the computer device 20 having components 21 to 22, but it should be understood that implementing all of the shown components is not a requirement, and more or fewer components may be implemented instead.

According to some embodiments, the memory 21 (i.e. a readable storage medium) includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. According to some embodiments, the memory 21 may be an internal storage unit of the computer device 20, for example, a hard disk or a memory of the computer device 20. According to some embodiments, the memory 21 may alternatively be an external storage device of the computer device 20, for example, a plug-in hard disk provided on the computer device 20, a smart media card (SMC), a secure digital (SD) card, a flash card, etc. Certainly, the memory 21 may alternatively include both the internal storage unit of the computer device 20 and the external storage device thereof. According to some embodiments, the memory 21 is generally used to store an operating system and various types of application software installed in the computer device 20, such as the program code of the multi-terminal screen-projection apparatus 10 according to some embodiments. In addition, the memory 21 may be used to temporarily store various types of data that has been output or will be output.

The processor 22 may be, according to some embodiments, a central processing unit (CPU), a controller, a microcontroller, a microprocessor, or other data processing chips. The processor 22 is generally used to control the overall operation of the computer device 20. According to some embodiments, the processor 22 is used to run program code or processing data stored in the memory 21, for example, to run the multi-terminal screen-projection apparatus 10 to implement the method of screen-projection with multiple terminals according to some embodiments.

The present application further provides a computer-readable storage medium, such as a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, and an App application store, on which computer-readable instructions are stored to enable corresponding functions to be implemented when a program is executed by a processor. The computer-readable storage medium according to some embodiments is used to store the multi-terminal screen-projection apparatus 10, where when the multi-terminal screen-projection apparatus is executed by a processor, the following steps are implemented:

creating at least two projected-screen receiving sources according to a local IP address and at least two idle port numbers, and also generating respective stream pushing addresses of the at least two projected-screen receiving sources, so that at least two screen projecting terminals obtain the respective stream pushing addresses in a one-to-one correspondence;

establishing, for each of the at least two projected-screen receiving sources, a screen-projection connection between the projected-screen receiving source and a corresponding screen projecting terminal, where the corresponding screen projecting terminal is a screen projecting terminal obtaining a stream pushing address of the projected-screen receiving source; and receiving, by each of the at least two projected-screen receiving sources, projected-screen data pushed by the corresponding screen projecting terminal.

By using the above technical solutions, the present application has the beneficial effects as follows.

In the present application, at first, at least two projected-screen receiving sources are created according to a local IP address and at least two idle port numbers, and respective stream pushing addresses of the at least two projected-screen receiving sources are also generated, so that at least two screen projecting terminals obtain the respective stream pushing addresses in a one-to-one correspondence; then, for each of the at least two projected-screen receiving sources, a screen-projection connection between the projected-screen receiving source and a screen projecting terminal obtaining a stream pushing address of the projected-screen receiving source is established; finally, projected-screen data pushed by the screen projecting terminals in screen-projection connection with the corresponding projected-screen receiving sources are received by each of the at least two projected-screen receiving sources. As such, the present application can achieve the aim of audio and video data of a plurality of screen projecting terminals being projected to the same terminal subjected to screen projecting, thereby improving the user experience.

Through the description of the above implementations, those skilled in the art can clearly understand that the method of the above embodiments may be implemented by software plus a necessary general hardware platform, and definitely may alternatively be implemented by hardware, but in most cases, the former is a preferred implementation.

The foregoing descriptions are merely illustrative of some embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of screen-projection with multiple terminals, comprising:
   creating at least two projected-screen receiving sources according to a local Internet Protocol (IP) address and at least two idle port numbers, and generating respective stream pushing addresses of the at least two projected-screen receiving sources, so that at least two screen projecting terminals obtain the respective stream pushing addresses in a one-to-one correspondence;
   establishing, for each of the at least two projected-screen receiving sources, a screen-projection connection between the projected-screen receiving source and a corresponding screen projecting terminal, wherein the corresponding screen projecting terminal is a screen projecting terminal obtaining a stream pushing address of the projected-screen receiving source; and
   receiving, by each of the at least two projected-screen receiving sources, projected-screen data pushed by the corresponding screen projecting terminal.

2. The method according to claim 1, wherein the generating respective stream pushing addresses of the at least two projected-screen receiving sources comprises:
   generating the respective stream pushing addresses of the at least two projected-screen receiving sources according to the local IP address and the at least two idle port numbers, and generating and displaying respective two-dimensional codes corresponding to the at least two projected-screen receiving sources according to the respective stream pushing addresses of the at least two projected-screen receiving sources, so that the at least two screen projecting terminals scan the respective two-dimensional codes in a one-to-one correspondence and obtain the respective stream pushing addresses corresponding to the at least two projected-screen receiving sources from the scanned respective two-dimensional codes.

3. The method according to claim 1, wherein each of the at least two projected-screen receiving sources is a receiving source for receiving projected-screen data pushed based on a real-time messaging protocol.

4. The method according to claim 1, wherein the projected-screen data comprises video data and/or audio data.

5. The method according to claim 4, wherein the projected-screen data comprises the video data, and wherein after the video data is received, the method further comprises:
   performing video decoding on the received video data to obtain decoded video data, and rendering and displaying the decoded video data.

6. The method according to claim 4, wherein the projected-screen data comprises the audio data, and wherein after the audio data is received, the method further comprises:
   performing audio decoding on the received audio data to obtain decoded audio data, and mixing the decoded audio data.

7. The method according to claim 1, further comprising:
   in response to detecting no projected-screen data is received by a projected-screen receiving source of the at least two projected-screen receiving sources within a predetermined period of time, disconnecting the screen-projection connection between the projected-screen receiving source and the corresponding screen projecting terminal.

8. The method according to claim 1, further comprising:
   in response to receiving screen-projection disconnection instruction for disconnecting the screen-projection connection between a projected-screen receiving source of the at least two projected-screen receiving sources and the corresponding screen projecting terminal, disconnecting the screen-projection connection between the projected-screen receiving source and the corresponding screen projecting terminal.

9. A computer device, comprising:
   one or more processors; and
   one or more memories storing one or more programs configured to be executed by the one or more processors, the one or more programs comprising instructions for:
   creating at least two projected-screen receiving sources according to a local Internet Protocol (IP) address and at least two idle port numbers, and generating respective stream pushing addresses of the at least two projected-screen receiving sources, so that at least two screen projecting terminals obtain the respective stream pushing addresses in a one-to-one correspondence;
   establishing, for each of the at least two projected-screen receiving sources, a screen-projection connection between the projected-screen receiving source and a corresponding screen projecting terminal, wherein the corresponding screen projecting terminal is a screen projecting terminal obtaining a stream pushing address of the projected-screen receiving source; and
   receiving, by each of the at least two projected-screen receiving sources, projected-screen data pushed by the corresponding screen projecting terminal.

10. The computer device according to claim 9, wherein the generating respective stream pushing addresses of the at least two projected-screen receiving sources comprises:
    generating the respective stream pushing addresses of the at least two projected-screen receiving sources according to the local IP address and the at least two idle port numbers, and generating and displaying respective two-dimensional codes corresponding to the at least two projected-screen receiving sources according to the respective stream pushing addresses of the at least two projected-screen receiving sources, so that the at least two screen projecting terminals scan the respective two-dimensional codes in a one-to-one correspondence and obtain the respective stream pushing addresses corresponding to the at least two projected-screen receiving sources from the scanned respective two-dimensional codes.

11. The computer device according to claim 9, wherein each of the at least two projected-screen receiving sources is a receiving source for receiving projected-screen data pushed based on a real-time messaging protocol.

12. The computer device according to claim 9, wherein the projected-screen data comprises video data and/or audio data.

13. The computer device according to claim 12, wherein the projected-screen data comprises the video data, and wherein after the video data is received, the one or more programs further comprise instructions for:
performing video decoding on the received video data to obtain decoded audio data, and rendering and displaying the decoded video data.

14. The computer device according to claim 12, wherein the projected-screen data comprises the audio data, and wherein after the audio data is received, the one or more programs further comprise instructions for:
performing audio decoding on the received audio data to obtain decoded audio data, and mixing the decoded audio data.

15. The computer device according to claim 9, wherein the one or more programs further comprise instructions for:
in response to detecting no projected-screen data is received by a projected-screen receiving source of the at least two projected-screen receiving sources within a predetermined period of time, disconnecting the screen-projection connection between the projected-screen receiving source and the corresponding screen projecting terminal.

16. The computer device according to claim 9, wherein the one or more programs further comprise instructions for:
in response to receiving a screen-projection disconnection instruction for disconnecting a screen-projection connection between a projected-screen receiving source of the at least two a projected-screen receiving sources and the corresponding screen projecting terminal, disconnecting the screen-projection connection between the one projected-screen receiving source and the corresponding screen projecting terminal.

17. A non-transitory computer-readable storage medium storing one or more programs, the one or more programs comprising instructions, upon executed by one or more processors of an electronic device, cause the electronic device to perform operations comprising:
creating at least two projected-screen receiving sources according to a local Internet Protocol (IP) address and at least two idle port numbers, and generating respective stream pushing addresses of the at least two projected-screen receiving sources, so that at least two screen projecting terminals obtain the respective stream pushing addresses in a one-to-one correspondence;
establishing, for each of the at least two projected-screen receiving sources, a screen-projection connection between the projected-screen receiving source and a corresponding screen projecting terminal, wherein the corresponding screen projecting terminal is a screen projecting terminal obtaining a stream pushing address of the projected-screen receiving source; and
receiving, by each of the at least two projected-screen receiving sources, projected-screen data pushed by the corresponding screen projecting terminal.

18. The non-transitory computer-readable storage medium according to claim 17, wherein the generating respective stream pushing addresses of the at least two projected-screen receiving sources comprises:
generating the respective stream pushing addresses of the at least two projected-screen receiving sources according to the local IP address and the at least two idle port numbers, and then generating and displaying respective two-dimensional codes corresponding to the at least two projected-screen receiving sources according to the respective stream pushing addresses of the at least two projected-screen receiving sources, so that the at least two screen projecting terminals scan the respective two-dimensional codes in a one-to-one correspondence and obtain the respective stream pushing addresses corresponding to the at least two projected-screen receiving sources from the scanned respective two-dimensional codes.

19. The non-transitory computer-readable storage medium according to claim 17, wherein each of the at least two projected-screen receiving sources is a receiving source for receiving projected-screen data pushed based on a real-time messaging protocol.

20. The non-transitory computer-readable storage medium according to claim 17, wherein the instructions, upon executed by one or more processors of the electronic device, further cause the electronic device to perform operations comprising:
in response to detecting no projected-screen data is received by a projected-screen receiving source of the at least two projected-screen receiving sources within a predetermined period of time, disconnecting the screen-projection connection between the projected-screen receiving source and the corresponding screen projecting terminal.

\* \* \* \* \*